Dec. 9, 1947.  M. P. MATUSZAK  2,432,482
ALKYLATION PROCESS
Filed June 29, 1945

INVENTOR
M. P. MATUSZAK
BY Hudson & Young
ATTORNEYS

Patented Dec. 9, 1947

2,432,482

UNITED STATES PATENT OFFICE 2,432,482

ALKYLATION PROCESS

Maryan P. Matuszak, Bartlesville, Okla., assignor to Phillips Petroleum Company, a corporation of Delaware Application June 29, 1945, Serial No. 602,247

8 Claims. (Cl. 260—683.4)

This invention relates to an alkylation process. In one aspect it relates to a method of removing organically combined halogen (herein designated "organic halogen") such as fluorine or chlorine from paraffin hydrocarbon materials contaminated therewith. In another aspect it relates to an improved method of alkylating a low-boiling paraffin, usually an isoparaffin, with an alkylating agent, usually a low-boiling olefin, to make a higher-boiling paraffin (known in the art as alkylate) which is useful as a high octane base or blending stock for motor and aviation fuel.

The principal object of this invention is to provide an improved alkylation process.

Another object is to provide an improved method of removing organic halogen from paraffin hydrocarbon materials containing same.

Another object is to provide an improved method of removing organic fluorine from paraffin hydrocarbon material contaminated therewith such as alkylate made by alkylation of an isoparaffin with an olefin by means of hydrofluoric acid as a catalyst.

Another object is to provide a defluorination method which eliminates the necessity of using bauxite treaters.

Numerous other objects will hereinafter appear.

Figure 1:
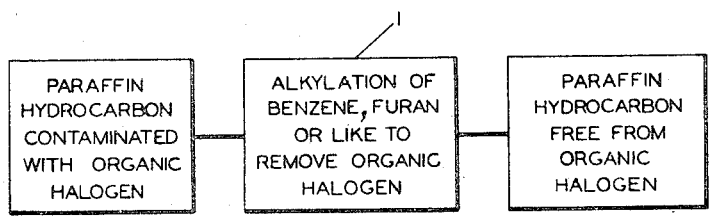

In the accompanying drawing Fig. 1 portrays diagrammatically the organic halogen removal process of the present invention.

Figure 2:
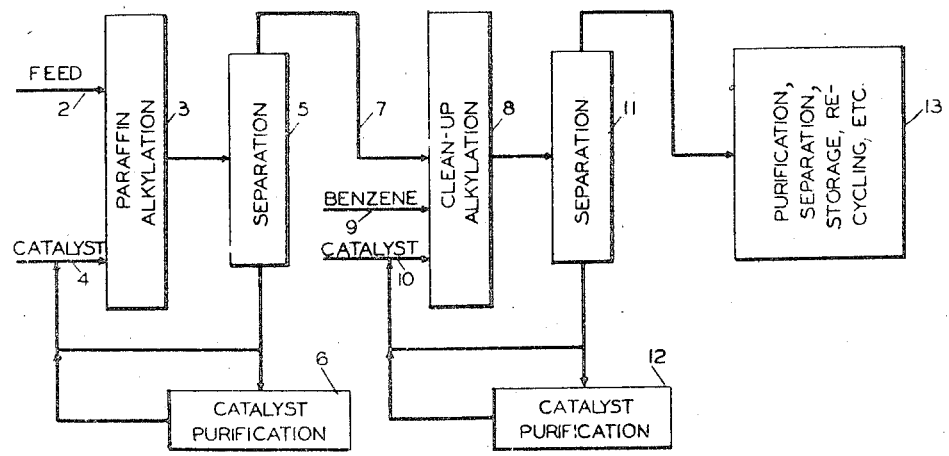

Fig. 2 is a flow diagram depicting an arrangement of equipment for carrying out a preferred embodiment of the present invention wherein the alkylatable material employed in the secondary alkylation step to remove the organic halogen is kept from entering the main or primary alkylation system, separate and complete catalyst separation and purification systems being provided for both alkylation steps.

In one embodiment, the invention comprises, in combination, alkylating a paraffin in the presence of a halogen-containing catalyst; mixing with the resulting alkylation reaction mixture, when the paraffin alkylation is substantially completed, a relatively easily alkylatable cyclic organic compound; and recovering hydrocarbons of relatively minimized content of organic halogen.

The paraffin, the alkylating agent, and the catalyst may be materials known to the art. Ordinarily, an isoparaffin is selected because of its relatively high reactivity, and it is usually isobutane because of its availability at comparatively low cost. The alkylating agent is usually one or more olefins, but in some alkylations it may be a derivative of an olefin, such as an alkyl halide, an alcohol, or the like. The catalyst may be any halogen-containing compound or mixture that is effective for promoting alkylation of the selected paraffin with the selected alkylating agent. Hydrofluoric acid is preferred for alkylation of an isoparaffin with olefins heavier than ethylene or with polar nonprimary alkyl compounds. When ethylene or a primary alkyl compound is used as alkylating agent, the catalyst is advantageously a mixture of hydrofluoric acid and boron fluoride; this catalyst may also be used in alkylation of normal paraffins. Ordinarily, however, when a normal paraffin is being alkylated or when the alkylating agent is ethylene, the preferred catalyst is aluminum chloride or bromide, promoted with a hydrogen halide, usually hydrogen chloride, as in the manufacture of diisopropyl and other hydrocarbons from isobutane and ethylene.

In the paraffin alkylation step, conditions for which depend upon the particular reactants and catalyst and may be selected in accordance with knowledge available to the art, some byproducts containing a small proportion of organic halogen are formed. The presence of the organic halogen in the alkylate and in the unconsumed reactants is highly undesirable, representing as it does a consumption of the catalyst and a contamination of the product and unconsumed reactants. The presence of the organic halogen necessitates expensive operations for removal, such as contacting at a suitable temperature with solid metal oxide or other materials that catalytically split out the halogen as the hydrogen halide or react to form metal halides. Treating with bauxite or similar material exemplifies such an operation for removing chlorine or fluorine. When fluorine is the halogen, considerable difficulty arises because of the formation of silicon tetrafluoride from silica present in the contacting agent; the silicon tetrafluoride is carried away with the effluent hydrocarbon stream and subsequently causes trouble by becoming hydrolyzed by moisture, forming silicic acid that plugs equipment and necessitates expensive shutdowns for removal. Eliminating or minimizing the formation of the organic halogen is a highly desired objective.

In accordance with this invention, this objective is attained by mixing with the alkylation reaction mixture, after the alkylation of the paraffin is substantially completed, a relatively easily alkylatable cyclic organic compound in minor proportion, at least one and preferably five or more times that chemically equivalent to the organic halogen, whereupon the organic halogen compounds are consumed by alkylating the added compound. Thereby the organic halogen is liberated as the hydrogen halide, which becomes available for re-use as catalyst in the alkylation step. The added compound preferably should be one that can be tolerated in the product so that separation of it or of its alkylate need not be effected; however, such separation may be practiced without going beyond the broad concept of this invention. When the paraffin alkylation is conducted for the purpose of manufacturing motor-fuel ingredients, benzene is ordinarily a highly satisfactory compound, inasmuch as it and its alkylates are themselves good motor-fuel ingredients. However, other compounds may be equally or even better suited for specific applications of this invention. Among compounds that may be used in this way are furan and its alkylatable homologs and derivatives, such as 2-furoic acid, methyl 2-furoate, 2-furyl-phenylketone, and the like; furan is especially suitable when a minor proportion of a compound containing nuclear oxygen can be tolerated, for it is exceedingly easily alkylated, being in this respect superior to benzene and other alkylatable aromatic hydrocarbons though it is inferior to some of these in its capacity for being alkylated by virtue of having a smaller number of replaceable hydrogen atoms per molecule. Similar alkylatable compounds which in part may be characterized as having at least two conjugated double bonds in a ring, also are sometimes useful; examples are phenol, pyrrol, thiophene, and homologs of these, but usually benzene or furan is to be preferred.

Furan is especially advantageous because of its low boiling point, which facilitates separation and recycling of unreacted furan, when desired. However, when a compound of relatively high boiling point is permissible, toluene is an exceedingly satisfactory compound to use, for it is relatively more reactive than benzene; other alkylatable hydrocarbon derivatives of benzene, such as ethylbenzene, xylene, cumene, and mesitylene, can also be used in accordance with desired boiling-point characteristics or requirements. When nonnuclear oxygen is permissible, anisole is an excellent compound to use, being exceedingly reactive and free from the corrosiveness of phenol, already mentioned. When a compound of exceedingly high boiling point is desired, as for the purpose of facile removal from the main alkylation product through fractional distillation, cresol is especially advantageous because of its relatively high reactivity for becoming alkylated by the organic halogen compounds. It is clear that many compounds are suitable for use in this invention, and that they are not always full equivalents of each other. The best choice for any particular application may be based on cost, availability, and such characteristics or properties of itself or of its alkylates that have a bearing on its suitability for inclusion in the main alkylation product or on its ease of removal when removal from the main alkylation product and/or recycling is desired; alternatively, a choice among several suitable compounds may be based on the results of small-scale trials.

Intimate mixing of the added compound with the paraffin-alkylation reaction mixture, including the catalyst, is essential. The mixing period required depends upon the added compound, upon the reactivity of the organic halogen compounds, and upon the activity of the catalyst, but a suitable period, which is ordinarily measurable in minutes or seconds, can be readily found by trial for any specific application. In general, the conditions are similar to those used in the paraffin-alkylation step, so that heating, cooling, or other extraneous operations are not necessary. When the added compound is sufficiently reactive under the paraffin-alkylation conditions, special mixing means may be unnecessary. Thereupon, the added compound may be simply dispersed, as by ejection from one or more jets, into the reaction mixture effluent from the paraffin-alkylation reactor, so that the removal of organic fluorine is effected during passage to the settler of the conventional paraffin-alkylation system; baffles may be provided to maintain intimate mixing during this passage. In any case the added compound should not be injected into the paraffin-alkylation reactor, wherein it would compete with the paraffin for the alkylating agent fed to this reactor, but traces added in recycled material may be economically permissible.

This invention may be applied in combination with steps other than a paraffin-alkylation step. For example, it may be combined with a paraffin-isomerization step or a paraffin-disproportionation step wherein organic halogen byproducts are formed because of the presence of a halogen-containing catalyst. The effluent of such step is treated substantially as has been described for paraffin-alkylation. The term paraffin-reconstruction may be considered as being generic to paraffin-alkylation, paraffin-isomerization, and paraffin-disproportionation.

Among advantages provided by this invention by its clean-up action on any unreacted alkylating agent and on organic halogen compounds are: decreased catalyst consumption; decreased expense and labor for dehalogenation; and increased yield of organic compounds suitable for use in motor fuels. The removal of olefins is especially desirable when normal butane, for example, is removed from the reaction mixture and is subsequently catalytically isomerized to isobutane.

In Fig. 1 of the drawing, the paraffin hydrocarbon material contaminated with organic halogen, usually fluorine or chlorine, such as alkylate from hydrofluoric acid alkylation of isoparaffins with olefins or alkylate resulting from alkylation of isoparaffins with olefins by means of aluminum chloride promoted with hydrogen chloride, or the hydrocarbon effluent of any conversion which causes organic halogen to appear therein, is shown as passing to step 1 where benzene or furan or the like is alkylated to remove the organic halogen. The paraffin hydrocarbon freed from organic halogen is recovered from the resulting mixture, with or without separation of the alkylated benzene, furan, or the like from the purified paraffin hydrocarbon.

In a preferred modification of this invention, the paraffin-alkylation or similar paraffin-reconstruction step and the clean-up or organic fluorine-consuming step are conducted each with its own body of catalyst. Thereby any carry-over of unconsumed added compound (e. g. benzene) from the latter step to the former as a solution in recycled catalyst is avoided. Such carry-over is disadvantageous in that the benzene or other added compound would compete with the paraffin for the olefin or other alkylating agent fed to the process. This modification requires a separator between the two steps for the purpose of separating the reaction mixture effluent from the first step into a hydrocarbon phase, which is passed to the second step, and into a catalyst phase, which is recycled to the first step or is passed to a purification system. This modification is indicated in Fig. 2 of the accompanying drawing wherein the paraffin-olefin feed enters primary alkylation step 3 via line 2, catalyst such as HF or aluminum chloride entering via line 4. The alkylation effluent may be separated into two phases in unit 5, a catalyst phase which is largely recycled, the balance being purified in unit 6 in known manners, and a hydrocarbon phase which may be passed via line 7 directly to the secondary alkylation step 8. Where the primary alkylation was catalyzed with HF, an additional step of flashing or stripping or fractional distillation (not shown) may be interposed in line 7 to remove a mixture of HF and light hydrocarbons such as pentane, butane, and propane. Thus the secondary alkylation may be applied only to a portion of the hydrocarbon phase separated in unit 5. For example, the secondary alkylation may be employed in place of the bauxite defluorinators now employed to remove organically combined fluorine from various hydrocarbon streams in HF alkylation plants. Benzene or like relatively easily alkylatable cyclic organic compound is introduced to zone 8 via line 9 while catalyst, which may be HF or any other catalyst suitable for effecting the secondary alkylation is introduced via line 10. The alkylation effluent from unit 8 is passed to separator 11 where a hydrocarbon phase is separated from a catalyst phase. The catalyst phase is largely recycled but a sufficient portion thereof to keep catalyst activity adequate is passed to purification unit 12. The hydrocarbon phase is treated in any way, as indicated by unit 13, to recover the desired products therefrom. The alkylated benzene, furan, or the like may be recovered separately from the isoparaffin-olefin alkylate or in admixture therewith. If desired, one common unit may replace units 6 and 12.

*Example 1*

Two portions of a mixture of hydrocarbon and hydrofluoric acid effluents from hydrofluoric acid alkylation of isobutane with butylenes were manually shaken for 15 minutes at room temperature. To one was added, before the shaking, benzene amounting to 0.92 weight per cent of the hydrocarbons present. The mixtures were separated into two phases. The hydrocarbon phase from each was freed from dissolved hydrofluoric acid and was then analyzed for organic fluorine. That without benzene contained 0.0058 weight per cent organic fluorine, whereas that with benzene contained only 0.0011 weight per cent.

*Example 2*

To a portion of the effluent reaction mixture from a hydrofluoric acid alkylation of isobutane with butylenes was added benzene amounting to 0.98 weight per cent of the hydrocarbons present, and the resulting mixture was mechanically agitated for 7 minutes at 71° F. On recovery and analysis of the hydrocarbons, the content of organic fluorine therein was found to be 0.0000 weight per cent. In similar treatment of another portion of the alkylation reaction mixture without the addition of benzene, the content of organic fluorine was found to be 0.0082 weight per cent. In similar treatment with benzene but without the hydrofluoric acid, no decrease in organic fluorine content was effected even on agitating at 208–217° F. for 1 hour; this result showed that the catalyst as well as the benzene was essential.

*Example 3*

To the reaction mixture effluent from aluminum chloride-catalyzed alkylation of isobutane with ethylene is added benzene in a proportion roughly 5 to 50 times that equivalent to the organic chlorine normally found in the hydrocarbons when freed from the catalyst. The mixture is agitated for up to 5 minutes and is then processed in the normal manner for recovery of products and recycling of catalyst and unreacted isobutane. The products contain substantially no organic chlorine.

*Example 4*

A reaction mixture effluent from aluminum chloride-catalyzed isomerization of normal butane to isobutane is treated in the manner described in Example 3 to yield hydrocarbon material relatively substantially free from organic chlorine.

*Example 5*

A continuous pilot-plant run was made for the catalytic alkylation of isobutane. The hydrocarbon feed was taken from the feed line to a commercial alkylation plant; it had the following approximate composition, in weight per cent: propylene, 0.1; propane, 2.0; isobutane, 66.3; isobutylene, 2.2; butene-1, 2.4; normal butane, 13.9; butene-2, 2.4; 2-methylbutene-1, 0.3; pentene-1, 0.9; isopentane, 2.6; 2-methylbutene-2, 1.0; pentene-2, 2.0; normal pentane, 3.4; heavier hydrocarbons, 0.5. The catalyst was hydrofluoric acid taken from the acid-recycle line of a commercial alkylation plant. Two reactors were used in series: the primary reactor had a capacity of 1470 ml. and was provided with a 1725-R. P. M. turbo-mixer; the secondary reactor had a capacity of 630 ml. and was provided with a 1725-R. P. M. 4-vane paddle-type stirrer. After the run had been in progress for 1.6 hours, with collection of hydrocarbon and acid effluents for subsequent analysis, a solution of 3.1 weight per cent of benzene in normal butane was added to the secondary reactor at a uniform rate, whereby benzene was added to the extent of 0.12 weight per cent of the total hydrocarbons present, and the run was continued for 2.4 hours with collection of effluents for subsequent analysis. Organic fluorine in each hydrocarbon effluent was determined by the method of Matuszak and Brown (Ind. Eng. Chem., Anal. Ed., 17, 100–6 (1945)). The conditions of the run and the pertinent data obtained may be summarized as follows:

| Reactor | Primary | Secondary |
| --- | --- | --- |
| Temperature, ° F | 90 | 94 |
| Pressure, p. s. i. | 135 | 130 |
| Contact time, min | 10.1 | 4.3 |
| Hydrocarbon/acid, vol | 0.93 | 0.93 |
| Isobutane/olefin, mol | 6.13 | |
| Titratable acidity, wt. per cent HF: | | |
| Influent | 89.6 | 86.8 |
| Effluent | 86.8 | 86.9 |
| Organic fluorine, wt. per cent: | | |
| Before adding benzene | | 0.0099 |
| After adding benzene | | 0.0052 |

It will be observed that the addition of benzene, even in so small a proportion as 0.12 per cent, decreased the content of organic fluorine in the total hydrocarbon effluent from 0.0099 per cent to 0.0052 per cent. Thus, in this run, which was made without recycling of the acid, the content of organic fluorine was approximately halved. When acid from the secondary reactor is recycled back to the same reactor, the acid in this reactor accumulates a considerable content of benzene and of partly alkylated benzene, so that the concentration of relatively easily alkylatable aromatic hydrocarbons becomes considerably increased above that present in this run, and consequently the content of organic fluorine is further substantially decreased. Furthermore, when acid from the primary reactor, instead of being passed to the secondary reactor, is recycled to the primary reactor, the content of organic fluorine in the hydrocarbon effluent from the primary reactor is generally about twice that present in this run, so that the amount of organic fluorine destroyed through the addition of benzene is substantially larger than in this run.

*Example 6*

In a pilot-plant run in which were obtained comparative data illustrating the influence of concentration of added compound in the practice of this invention, three liquefied hydrocarbon feeds differing in content of added benzene were used. Feed A was a portion of the total acid-freed hydrocarbon effluent from a commercial hydrofluoric acid alkylation unit in which primarily isobutane had been alkylated with olefins; it contained no added benzene. Feed B was a second portion of the same hydrocarbon alkylation effluent, to which was added C. P. benzene to the extent of 0.10 per cent by weight of the total feed. Feed C was a third portion of the same hydrocarbon alkylation effluent, to which was added benzene to the extent of 1.00 per cent by weight of the feed. Although prepared from the same hydrocarbon alkylation effluent, and consequently identical in hydrocarbon composition except for the added benzene, these feeds had slightly different contents of organic fluorine, attributively because of storage for different periods at different temperatures in different steel storage cylinders or mixing tanks that may have had different metallic surfaces or different amounts of rust; at the time of use, they contained, by analysis, 0.0222, 0.0257, and 0.0192 per cent by weight of organic fluorine, respectively.

The run was made in five contiguous periods, the first of which was almost 6 hours long and the others of which were 3 hours long each. During a particular period, only one particular feed was used; for the five periods, the order of the feeds was: A, B, A, C, A. The feed was pumped continuously at a substantially uniform rate into a 630-ml. reactor provided with a 1725-R. P. M. 4-vane paddle-type stirrer. In the reactor, it was intimately mixed for approximately 2 minutes with liquid hydrofluoric acid, which initially in this run was unused, distilled commercial substantially anhydrous acid that contained, by analysis, only 0.0006 per cent of sulfur dioxide. The resulting mixture was passed to a 7500-ml. settler, from which the acid was recycled by gravity to the reactor and from which the hydrocarbon effluent was passed to sample bombs or to disposal means. Periodically, unused make-up hydrofluoric acid was added to the reactor to replace acid removed with the hydrocarbon effluent and to maintain the proportion of acid in the reactor at approximately 40 per cent by liquid volume. The temperature of the reactor was 90° F. and the pressure within it was approximately 150 p. s. i. Samples of the hydrocarbon effluent from the settler were obtained for determination of the organic fluorine by the aforementioned method. The results may be summarized as follows:

| Period | Benzene in Feed, wt. Per cent | Contact Time, min. | Hour in Period | Org. F in Effluent, wt. Per cent |
|---|---|---|---|---|
| 1 | 0.00 | 2.3 | 1.9 | 0.0145 |
| 1 | 0.00 | 2.4 | 3.9 | 0.0132 |
| 1 | 0.00 | 2.5 | 5.9 | 0.0128 |
| 2 | 0.10 | 2.2 | 1.0 | 0.0075 |
| 2 | 0.10 | 2.5 | 1.5 | 0.0068 |
| 2 | 0.10 | 2.5 | 2.0 | 0.0065 |
| 3 | 0.00 | 2.1 | 1.0 | 0.0115 |
| 3 | 0.00 | 2.1 | 3.0 | 0.0148 |
| 4 | 1.00 | 2.1 | 1.0 | 0.0048 |
| 4 | 1.00 | 2.4 | 1.5 | 0.0041 |
| 5 | 0.00 | 2.1 | 2.0 | 0.0148 |
| 5 | 0.00 | 2.1 | 3.0 | 0.0131 |

In Period 1, made with Feed A, samples of the hydrocarbon effluent from the settler taken at approximately 2, 4, and 6 hours contained 0.0145, 0.0132, and 0.0128 per cent of organic fluorine, respectively. These data indicated that the hydrofluoric acid and hydrocarbon phases had become substantially mutually equilibrated, under the prevailing conditions, with respect to organic fluorine. The fact that the organic-fluorine content in the hydrocarbon phase was decreased by the hydrofluoric acid was due to extraction and alkylation in accordance with the general principles of the process disclosed in U. S. Patent 2,320,629, issued June 1, 1943.

At the end of Period 1 and beginning of Period 2, the hydrocarbon feed was switched from Feed A to Feed B. Inasmuch as the settler was not emptied, a considerable lag was to be expected insofar as change in organic fluorine in the effluent by the presence of 0.10 per cent of benzene in the feed was concerned. Nevertheless, samples of the hydrocarbon effluent taken at 1, 1.5, and 2 hours contained only 0.0075, 0.0068, and 0.0065 per cent of organic fluorine, indicating that the benzene, together with the hydrofluoric acid, was decreasing the organic fluorine to approximately a fourth of the original value of 0.0257 per cent.

In Period 3, made with Feed A, samples of the hydrocarbon effluent taken at 1 and 3 hours contained 0.0115 and 0.0148 per cent of organic fluorine. These data showed that the organic fluorine in the effluent had increased to the equilibration level and that benzene in the acid phase had consequently become substantially absent through depletion. They also substantiated the conclusion that the presence of benzene was responsible in Period 2 for the decrease in organic fluorine below the equilibration level observed in Period 1.

At the end of Period 3 and beginning of Period 4, the hydrocarbon feed was switched from Feed A to Feed C. Samples of the hydrocarbon effluent taken at 1 and 1.5 hours contained 0.0048 and 0.0041 per cent of organic fluorine. These data indicated that the presence of 1 per cent of benzene in the feed, together with the hydrofluoric acid, was decreasing the organic fluorine to approximately a fifth of the original value of 0.0192 per cent. By comparison of these data with those obtained for Period 2, it appears that most of the decrease in organic fluorine effected by the benzene was attributable to the first 0.1 per cent and that the decrease obtainable through additional benzene was subject to the law of diminishing returns, reflecting the decreased concentration of organic fluorine compounds available for reaction with the benzene.

In Period 5, made with Feed A, samples of the hydrocarbon effluent taken at 2 and 3 hours contained 0.0148 and 0.0131 per cent of organic fluorine, confirming that in Period 4 the decrease in organic fluorine below the equilibration level had been due to the added benzene.

Example 7

In a pilot-plant run in which were obtained comparative data illustrating the influence of contact time in the practice of this invention two hydrocarbon feeds were used. Feed D was a portion of the total hydrocarbon effluent from a commercial hydrofluoric acid alkylation unit in which primarily isobutane had been alkylated with olefins; it contained no added compound. Feed E was another portion of the same hydrocarbon alkylation effluent, to which was added technical furan to the extent of 0.10 per cent by weight of the total feed. Although prepared from the same hydrocarbon alkylation effluent, these feeds had somewhat different contents of organic fluorine, attributively because of different storage conditions; at the time of use, they contained, by analysis, 0.0185 and 0.0241 per cent by weight of organic fluorine, respectively.

The run was made substantially like that of Example 6, with the same apparatus. However, all five periods were approximately 3 hours long apiece, and in the last three periods the contact time, or time of residence of the hydrocarbon phase in the reactor, was approximately 4 instead of approximately 2 minutes. The feeds were used in the order D, E, D, E, D. The temperature was 90° F.; the pressure, 150 p. s. i.; the hydrofluoric acid in the reactor, between 40 and 55 per cent by volume of the total contents. The data obtained may be summarized as follows:

| Period | Furan in Feed, wt. Per cent | Contact Time, min. | Hour in Period | Org. F in Effluent, wt. Per cent |
|---|---|---|---|---|
| a | 0.00 | 2.2 | 1.6 | 0.0103 |
| a | 0.00 | 2.4 | 2.3 | 0.0106 |
| b | 0.10 | 2.0 | 1.0 | 0.0071 |
| b | 0.10 | 1.7 | 1.5 | 0.0069 |
| b | 0.10 | 1.9 | 2.5 | 0.0068 |
| b | 0.10 | 2.0 | 3.0 | 0.0058 |
| c | 0.00 | 5.1 | 2.0 | 0.0069 |
| c | 0.00 | 4.9 | 2.5 | 0.0060 |
| c | 0.00 | 3.2 | 3.0 | 0.0085 |
| d | 0.10 | 3.2 | 2.0 | 0.0092 |
| d | 0.10 | 3.9 | 2.5 | 0.0070 |
| d | 0.10 | 3.6 | 3.0 | 0.0029 |
| e | 0.00 | 3.6 | 2.0 | 0.0105 |
| e | 0.00 | 3.5 | 3.0 | 0.0118 |

Although these data are not quite so definite and clearcut as those of Example 6, because of the relatively increased lag in change in organic fluorine in the settler effluent brought about by the relatively longer contact time, they present a generally similar picture. In Period a, which corresponded to Period 1 of the preceding example, the hydrofluoric acid, which initially in this run was unused, distilled commercial substantially anhydrous acid, was becoming substantially equilibrated with respect to organic fluorine. In Period b, the organic fluorine was decreased because of the presence of furan in the feed, substantially similarly to the action observed in Period 2 of the preceding example. In Period c, during which no furan was added, the organic fluorine increased toward the equilibration value, though the increase was not observable in the effluent from the settler until about the end of the period, on account of the aforementioned increased lag; doubtless, evidence of actual attainment of the equilibration level would have been obtained if a sample of the effluent had been taken about 1.5 hours after the beginning of the next period. In Period d, the organic fluorine again decreased, because of the presence of furan, this time to only one-eighth of the original value of 0.0241 per cent, or to half of the residual value in Period b, because of the relatively longer contact time. Finally, in Period e, the organic fluorine again became increased to the equilibration level, reflecting depletion of furan in the acid phase.

Example 8

In a pilot-plant run testing the applicability of xylene in the practice of this invention, two hydrocarbon feeds were used. Feed F was a portion of the total hydrocarbon effluent from a commercial hydrofluoric acid alkylation unit in which primarily isobutane had been alkylated with olefins; it contained no added compound. Feed G was another portion of the same hydrocarbon alkylation effluent, to which was added xylene to the extent of 0.10 per cent by weight of the total feed. Although prepared from the same hydrocarbon alkylation effluent, these feeds had somewhat different contents of organic fluorine, attributively because of different storage conditions; at the time of use, they contained, by analysis, 0.0182 and 0.0195 per cent by weight of organic fluorine, respectively.

The run was made substantially like Examples 6 and 7, with the same apparatus. However, only three periods were used, and the contact time was somewhat shorter. The feeds were used in the order F, G, F. The temperature was 90° F.; the pressure, 140 p. s. i.; the hydrofluoric acid in the reactor, between 47 and 58 per cent by volume of the total contents. The data obtained may be summarized as follows:

| Period | Xylene in Feed, wt. Per cent | Contact Time, min. | Hour in Period | Organic F in Effluent, wt. Per cent |
|---|---|---|---|---|
| 1 | 0.00 | 1.6 | 5.25 | 0.0105 |
| 1 | 0.00 | 1.5 | 5.75 | 0.0092 |
| 2 | 0.10 | 1.6 | 1.80 | 0.0085 |
| 2 | 0.10 | 1.6 | 2.30 | 0.0087 |
| 2 | 0.10 | 1.5 | 3.30 | 0.0080 |
| 3 | 0.00 | 2.0 | 1.00 | 0.0122 |
| 3 | 0.00 | 2.2 | 1.50 | 0.0095 |

These data present the same general picture as Examples 6 and 7. In Period 1, the hydrofluoric acid, which initially in this run was fresh commercial substantially anhydrous acid, became equilibrated with respect to organic fluorine. In Period 2, the organic fluorine was decreased because of the presence of xylene in the feed. In Period 3, during which no xylene was added, the organic fluorine increased to the equilibration value. In comparison with the results of the preceding runs, the data appear to indicate that xylene is inferior to benzene and to furan; however, when allowance is made for the facts that xylene has a relatively high molecular weight and that the contact time in this run was relatively short, it is clear that xylene is also an advantageous compound for the practice of this invention.

Example 9

To the hydrocarbon phase effluent from a paraffin-reconstruction step catalyzed by a mixture of hydrofluoric acid and a minor proportion by weight of boron fluoride is added 0.1 to 1.0 per cent by weight of toluene. The resulting mixture is intimately contacted with anhydrous hydrofluoric acid, whereby organic fluorine compounds are consumed in alkylation of toluene. The reaction mixture is then processed for recovery of products and recycling of catalyst and unreacted reactants. The products and unreacted reactants are relatively substantially free from organic fluorine. By proceeding as indicated by this example, there is obtained not only a minimizing of organic fluorine but also an advantageous extractive recovery, by the hydrofluoric acid, of traces of boron fluoride dissolved or entrained in the hydrocarbon effluent from the paraffin-reconstruction step. As illustrated by this example, in particular cases the catalysts in the two steps may differ somewhat, although usually it is preferable for both to contain the same halogen.

Inasmuch as the invention may be practiced otherwise than as specifically shown, and inasmuch as many minor variations of it within its scope and spirit will be obvious to those skilled in the art, this invention should not be unduly restricted by the foregoing specification and examples but should be restricted only in accordance with the appended claims.

I claim:

1. An alkylation process comprising alkylating an isoparaffin with an olefin in the presence of hydrofluoric acid as an alkylation catalyst to produce an alkylate of higher-boiling paraffin containing organic fluorine compounds, separating the alkylation effluent into an acid layer and a hydrocarbon layer, withdrawing the acid layer and recycling a major proportion of same to said alkylating step, withdrawing the hydrocarbon layer and separating therefrom said alkylate of higher-boiling paraffin containing organic fluorine compounds, admixing therewith a relatively easily alkylatable cyclic organic compound in amount at least stoichiometrically equivalent to the amount of organic fluorine present therein, subjecting the resulting mixture in a second reaction zone to conditions effecting alkylation of said relatively easily alkylatable organic compound with said organic fluorine compounds in the presence of hydrofluoric acid as an alkylation catalyst to thereby effect removal of organic fluorine from said alkylate of higher-boiling paraffin, separating the resulting reaction mixture from said second reaction into an acid layer and a hydrocarbon layer, withdrawing said acid layer and recycling a major portion of same to said second reaction zone, and recovering from said hydrocarbon layer said alkylate of higher-boiling paraffin essentially free from organic fluorine.

2. An alkylation process comprising alkylating an isoparaffin with an olefin in the presence of hydrofluoric acid as an alkylation catalyst to produce an alkylate of higher-boiling paraffin containing organic fluorine compounds, separating the alkylation effluent into an acid layer and a hydrocarbon layer, withdrawing the acid layer and recycling a major proportion of same to said alkylating step, withdrawing the hydrocarbon layer and seperating therefrom said alkylate of higher-boiling paraffin containing organic fluorine compounds, admixing therewith a relatively easily alkylatable cyclic organic compound in amount at least stoichiometrically equivalent to the amount of organic fluorine present therein, subjecting the resulting mixture in a second reaction zone to conditions effecting alkylation of said relatively easily alkylatable cyclic organic compound with said organic fluorine compounds as essentially the only reaction in the presence of hydrofluoric acid as an alkylation catalyst to thereby effect removal of organic fluorine from said alkylate of higher-boiling paraffin, separating the resulting reaction mixture from said second reaction into an acid layer and a hydrocarbon layer, withdrawing said acid layer and recycling a major portion of same to said second reaction zone, and recovering from said hydrocarbon layer said alkylate of higher-boiling paraffin essentially free from organic fluorine.

3. An alkylation process comprising alkylating an isoparaffin with an olefin in the presence of hydrofluoric acid as an alkylation catalyst to produce an alkylate of higher-boiling paraffin containing organic fluorine compounds, separating the alkylation effluent into an acid layer and a hydrocarbon layer, withdrawing the acid layer and recycling a major proportion of same to said alkylating step, withdrawing the hydrocarbon layer and separating therefrom said alkylate of higher-boiling paraffin containing organic fluorine compounds, admixing therewith an aromatic compound in amount at least stoichiometrically equivalent to the amount of organic fluorine present therein, subjecting the resulting mixture in a second reaction zone to conditions effecting alkylation of said aromatic compound with said organic fluorine compounds in the presence of hydrofluoric acid as an alkylation catalyst to thereby effect removal of organic fluorine from said alkylate of higher-boiling paraffin, separating the resulting reaction mixture from said second reaction into an acid layer and a hydrocarbon layer, withdrawing said acid layer and recycling a major portion of same to said second reaction zone, and recovering from said hydrocarbon layer said alkylate of higher-boiling paraffin essentially free from organic fluorine.

4. An alkylation process comprising alkylating an isoparaffin with an olefin in the presence of hydrofluoric acid as an alkylation catalyst to produce an alkylate of higher-boiling paraffin containing organic fluorine compounds, separating the alkylation effluent into an acid layer and a hydrocarbon layer, withdrawing the acid layer and recycling a major proportion of same to said alkylating step, withdrawing the hydrocarbon layer and separating therefrom said alkylate of higher-boiling paraffin containing organic fluorine compounds, admixing therewith benzene in amount at least stoichiometrically equivalent to the amount of organic fluorine present therein, subjecting the resulting mixture in a second reaction zone to conditions effecting alkylation of said benzene with said organic fluorine compounds in the presence of hydrofluoric acid as an alkylation catalyst to thereby effect removal of organic fluorine from said alkylate of higher-boiling paraffin, separating the resulting reaction mixture from said second reaction into an acid layer and a hydrocarbon layer, withdrawing said acid layer and recycling a major portion of same to said second reaction zone, and recovering from said hydrocarbon layer said alkylate of higher-boiling paraffin essentially free from organic fluorine.

5. An alkylation process comprising alkylating an isoparaffin with an olefin in the presence of hydrofluoric acid as an alkylation catalyst to produce an alkylate of higher-boiling paraffin containing organic fluorine compounds, separating the alkylation effluent into an acid layer and a hydrocarbon layer, withdrawing the acid layer and recycling a major proportion of same to said alkylating step, withdrawing the hydrocarbon layer and separating therefrom said alkylate of higher-boiling paraffin containing organic fluorine compounds, admixing therewith furan in amount at least stoichiometrically equivalent to the amount of organic fluorine present therein, subjecting the resulting mixture in a second reaction zone to conditions effecting alkylation of said furan with said organic fluorine compounds in the presence of hydrofluoric acid as an alkylation catalyst to thereby effect removal of organic fluorine from said alkylate of higher-boiling paraffin, separating the resulting reaction mixture from said second reaction into an acid layer and a hydrocarbon layer, withdrawing said acid layer and recycling a major portion of same to said second reaction zone, and recovering from said hydrocarbon layer said alkylate of higher boiling paraffin essentially free from organic fluorine.

6. An alkylation process which comprises alkylating an isoparaffin with an olefin by means of hydrofluoric acid as an alkylation catalyst in a primary alkylation zone, separating the alkylation effluent into a liquid hydrocarbon phase and a liquid hydrofluoric acid phase, separately withdrawing said phases, removing a mixture of hydrogen fluoride and light paraffin hydrocarbons from said hydrocarbon phase, and passing the entire residue of said hydrocarbon phase including the entire alkylate of higher-boiling paraffin produced by said primary alkylation and the organic fluorine compounds produced incidental to said alkylation to a secondary alkylation zone, introducing a relatively easily alkylatable cyclic organic compound having at least two conjugated double bonds in the ring to said secondary alkylation zone, also introducing to said secondary alkylation zone hydrofluoric acid in amount sufficient to catalyze said secondary alkylation, effecting in said secondary alkylation zone alkylation of said cyclic organic compound with said organic fluorine compounds and thereby removing same from said alkylate, said cyclic organic compound and said organic fluorine compounds being essentially the only materials entering into reaction in said secondary alkylation zone, and recovering from the secondary alkylation zone said alkylate essentially free from organic fluorine.

7. The process of claim 6 wherein said cyclic organic compound is furan.

8. An alkylation process which comprises alkylating an isoparaffin with an olefin in the presence of hydrofluoric acid as a catalyst in a primary alkylation zone, passing the total hydrocarbon effluent from said primary alkylation zone to a secondary alkylation zone, said effluent comprising the alkylate of higher-boiling paraffin produced in said primary alkylation zone and organic fluorine compounds incidentally produced in said primary alkylation zone, introducing a relatively easily alkylatable cyclic organic compound to said secondary alkylation zone in stoichiometric excess of the organic fluorine compounds contained in said total hydrocarbon effluent, and alkylating said cyclic organic compound with said organic fluorine compounds in said secondary alkylation zone in the presence of hydrofluoric acid as a catalyst and thereby removing said organic fluorine compounds from said alkylate, and recovering said alkylate essentially free from organic fluorine from the effluent of said secondary alkylation zone.

MARYAN P. MATUSZAK.

REFERENCES CITED

The following references are of record in the file of this patent:

UNITED STATES PATENTS

| Number | Name | Date |
|---|---|---|
| 2,305,026 | Munday | Dec. 15, 1942 |
| 2,360,547 | Chenicek | Oct. 17, 1944 |
| 2,366,716 | Frey | Jan. 9, 1945 |
| 2,372,320 | Frey | Mar. 27, 1945 |
| 2,307,773 | Egloff | Jan. 12, 1943 |